United States Patent
Chandran

(10) Patent No.: US 7,975,644 B2
(45) Date of Patent: Jul. 12, 2011

(54) BATTER APPLICATOR WITH ADJUSTABLE TILT CONTROL FOR SUBMERGER OR COATING MECHANISM

(75) Inventor: Jogesh Chandran, Sandusky, OH (US)

(73) Assignee: John Bean Technologies Corporation, Chicago, IL (US)

(*) Notice: Subject to any disclaimer, the term of this patent is extended or adjusted under 35 U.S.C. 154(b) by 491 days.

(21) Appl. No.: 11/830,267

(22) Filed: Jul. 30, 2007

(65) Prior Publication Data

US 2008/0196665 A1  Aug. 21, 2008

Related U.S. Application Data

(63) Continuation-in-part of application No. 11/677,412, filed on Feb. 21, 2007.

(51) Int. Cl.
B05C 3/02 (2006.01)

(52) U.S. Cl. ............... 118/28; 118/26; 118/31; 426/302

(58) Field of Classification Search ............... 118/31, 118/26, 28, DIG. 6; 254/7 R; 426/302
See application file for complete search history.

(56) References Cited

U.S. PATENT DOCUMENTS

| | | | | |
|---|---|---|---|---|
| 100,639 | A * | 3/1870 | Keating | 15/3.11 |
| 842,641 | A * | 1/1907 | Fernau | 248/188.4 |
| 3,095,173 | A * | 6/1963 | Paruolo | 248/124.1 |
| 3,279,752 | A * | 10/1966 | Olsen | 254/7 R |
| 3,547,225 | A * | 12/1970 | Deane | 182/148 |
| 3,915,116 | A | 10/1975 | Booth | 118/16 |
| 3,967,583 | A | 7/1976 | Booth | 118/16 |
| 4,058,083 | A * | 11/1977 | Miller | 118/16 |
| 4,352,249 | A * | 10/1982 | Rose | 34/212 |
| 4,431,678 | A * | 2/1984 | Sollich | 426/306 |
| 4,461,594 | A * | 7/1984 | Waber | 403/59 |
| 4,791,705 | A * | 12/1988 | Corominas | 452/141 |
| 5,490,758 | A * | 2/1996 | Stone | 414/792.3 |
| 5,573,083 | A * | 11/1996 | Fletcher et al. | 187/205 |
| 5,632,369 | A | 5/1997 | Wadell | 198/525 |
| 5,842,678 | A * | 12/1998 | Svejkovsky | 248/650 |
| 5,924,356 | A | 7/1999 | Harper et al. | 99/494 |
| 6,183,792 | B1 | 2/2001 | Bettcher et al. | 426/289 |
| 6,186,280 | B1 * | 2/2001 | Healy | 187/207 |
| 6,244,170 | B1 | 6/2001 | Whited et al. | 99/494 |
| 6,269,739 | B1 | 8/2001 | Bettcher et al. | 99/494 |
| 6,510,810 | B2 * | 1/2003 | Nothum et al. | 118/26 |
| 7,000,658 | B1 * | 2/2006 | Soukiassian et al. | 144/3.1 |

(Continued)

FOREIGN PATENT DOCUMENTS

EP  1 269 868 A1  1/2003

(Continued)

OTHER PUBLICATIONS

European Search Report from Application No. 08151590.0-2313, dated Jun. 9, 2008.

*Primary Examiner* — Parviz Hassanzadeh
*Assistant Examiner* — Charles J Capozzi
(74) *Attorney, Agent, or Firm* — Christensen O'Connor Johnson Kindness PLLC

(57) ABSTRACT

A batter applicator with an adjustable coating mechanism is disclosed which includes a frame, a main batter tank, a structure comprising at least one of a submerger and an overflow structure that is adapted to be positioned proximate the main batter tank and actuatable means for tilting the structure relative to a reference horizontal surface.

29 Claims, 11 Drawing Sheets

U.S. PATENT DOCUMENTS

| | | | |
|---|---|---|---|
| 2002/0020343 A1 | 2/2002 | Nothum, Sr. et al. | 118/29 |
| 2002/0195593 A1* | 12/2002 | Ardrey et al. | 254/100 |
| 2005/0045049 A1 | 3/2005 | Muniga et al. | 99/494 |
| 2005/0169099 A1 | 8/2005 | Sprinkle | 366/152.5 |
| 2006/0028910 A1 | 2/2006 | Sprinkle | 366/152.5 |
| 2006/0032384 A1 | 2/2006 | Muniga et al. | 99/494 |

FOREIGN PATENT DOCUMENTS

| | | |
|---|---|---|
| GB | 2 327 331 A | 1/1999 |
| GB | 2 373 988 A | 10/2002 |
| WO | WO 2004/019708 A1 | 3/2004 |
| WO | WO 2006/103244 | 10/2006 |

\* cited by examiner

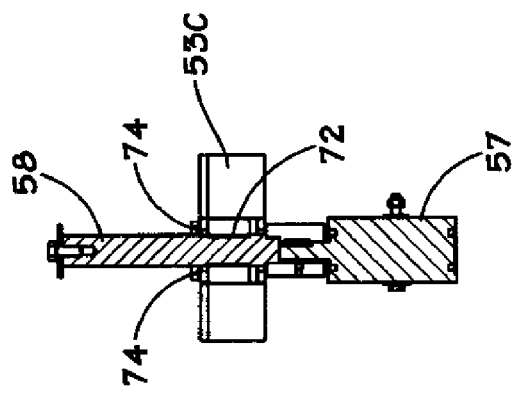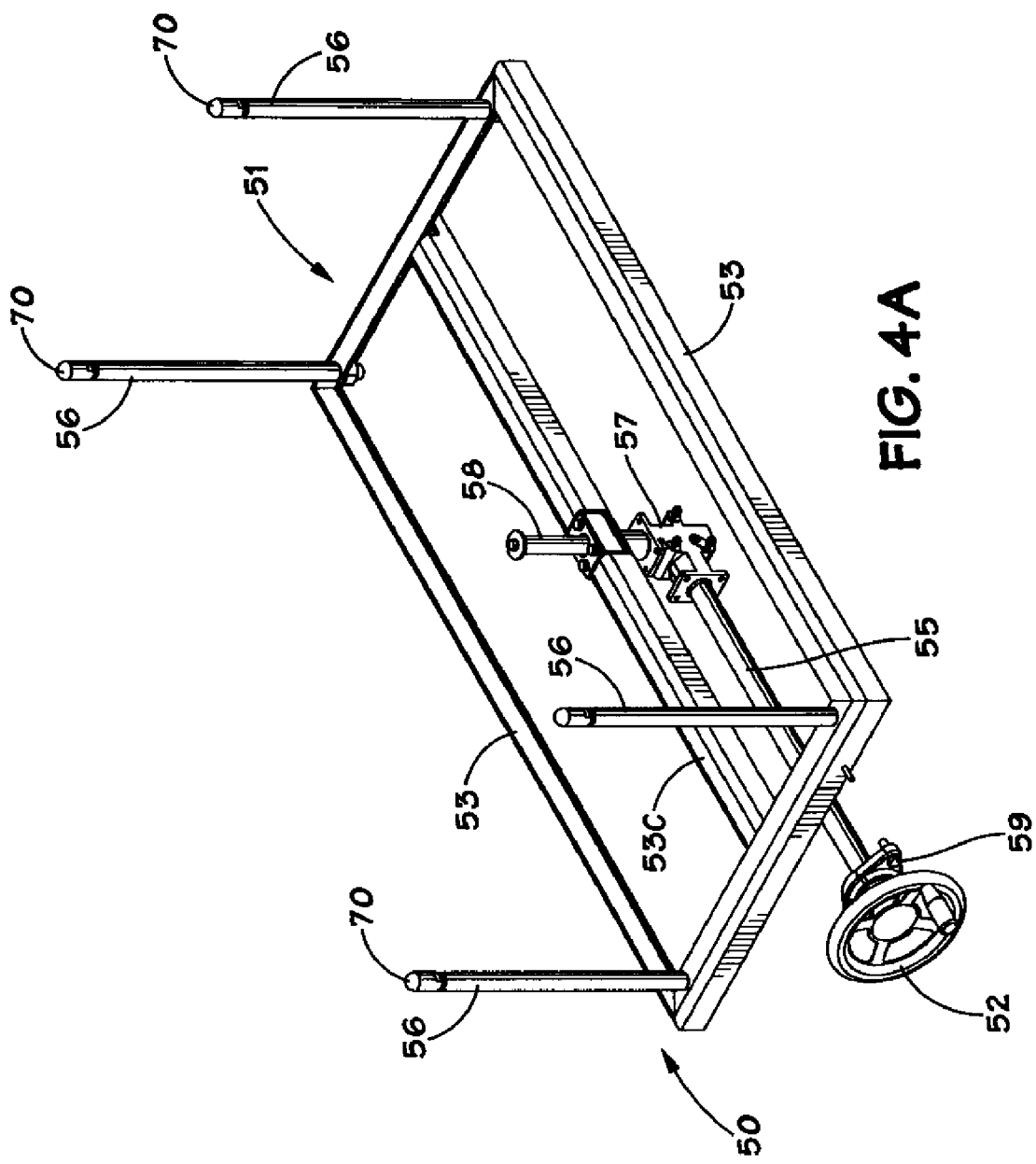

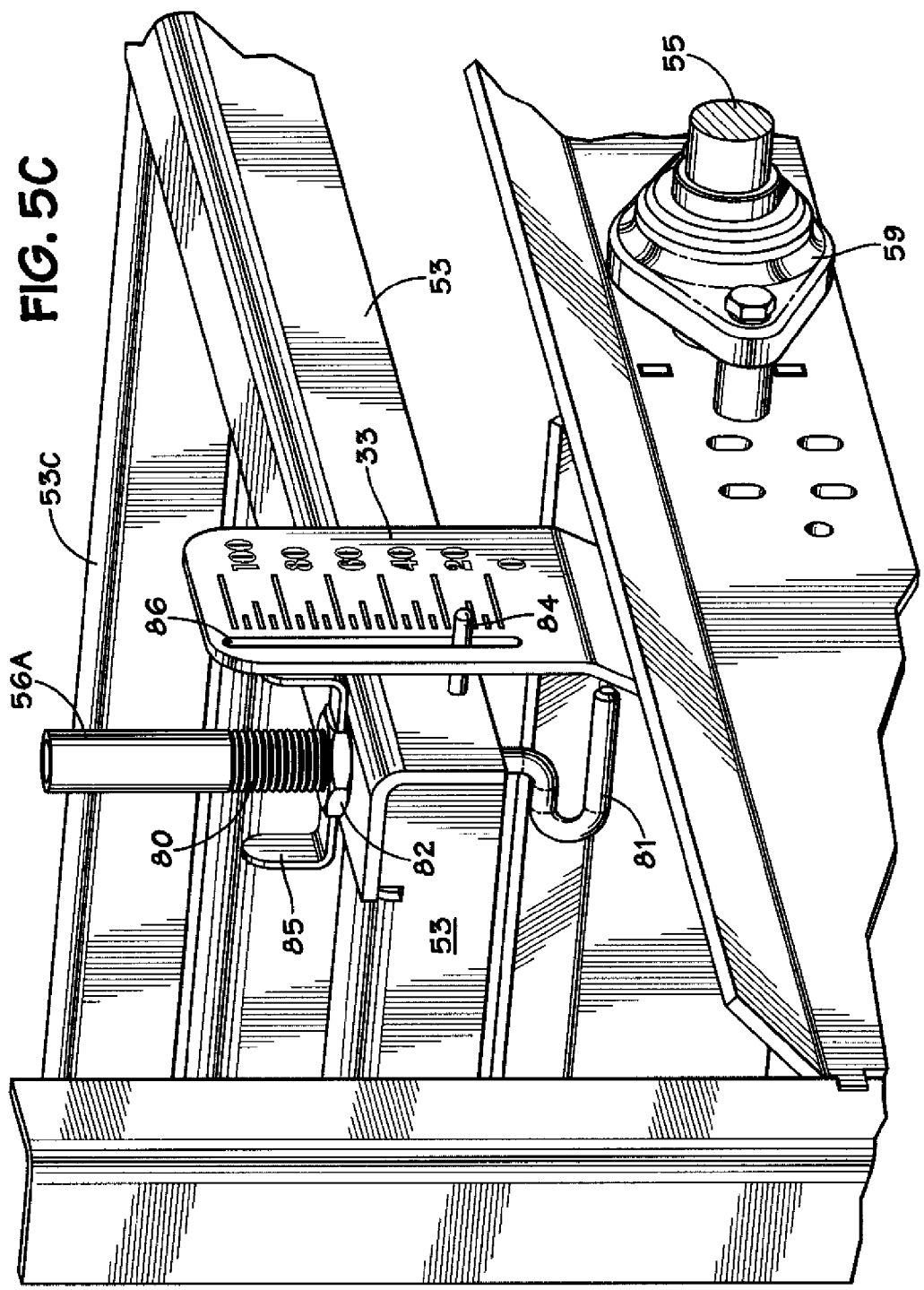

BATTER APPLICATOR WITH ADJUSTABLE TILT CONTROL FOR SUBMERGER OR COATING MECHANISM

CROSS-REFERENCE TO RELATED APPLICATION

This is a continuation-in-part of co-pending application Ser. No. 11/677,412, filed Feb. 21, 2007.

BACKGROUND OF THE INVENTION

1. Field of the Invention

The present invention is generally related to the field of food processing, and, more specifically, to a batter applicator with an adjustable tilt control for a submerger or coating mechanism.

2. Description of the Related Art

A batter applicator is used to coat food products in a controlled fashion so as to provide a uniform coating for a wide range of batter viscosities. Batter applicators may be employed to apply batter to many types of food products, e.g., chicken, vegetables, etc. Typically, the food is run through the batter applicator device wherein the food is submerged in a tank of batter or passed through a curtain of batter as it passes through the batter applicator. The purpose of the submerger and the curtain of batter is to insure that the food material is thoroughly coated with the batter.

In some cases, it is desirable to change the spacing between the main batter tank and the submerger or mechanism used to generate the curtain of batter. For example, such adjustments may be made due to processing different types of food of differing size and shape and/or using different types of batter, perhaps with differing viscosities. In prior art batter application devices, such spacing adjustments were typically accomplished by manually removing or loosening four bolts (or other mechanical fasteners) that supported the submerger or curtain generating mechanism and vertically repositioning the submerger or curtain generating device. Thereafter, the four bolts had to be re-inserted and/or retightened. Such a system for achieving the desired spacing was difficult for many reasons. For example, such a system required the machine operator to have and keep up with a separate tool for adjusting the bolts. The operator also had to move from side to side of the machine to make the necessary adjustments. Additionally, maintaining the submerger or curtain device level was difficult as all four bolts had to be adjusted equally. Moreover, using the prior art machine, such spacing adjustments were difficult to make while the machine was in use.

The present invention is directed to an apparatus for solving, or at least reducing the effects of, some or all of the aforementioned problems.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one illustrative embodiment, a batter applicator with an adjustable coating mechanism is disclosed which comprises a frame, a main batter tank, a structure comprising at least one of a submerger and an overflow structure that is adapted to be positioned proximate the main batter tank and actuatable means for tilting the structure relative to a reference horizontal surface.

In another illustrative embodiment, the batter applicator comprises a frame, a main batter tank, a structure comprising at least one of a submerger and an overflow structure that is adapted to be positioned proximate the main batter tank and a lifting device comprising a plurality of lift pins that are adapted to adjust the tilt of the structure relative to a reference horizontal surface.

BRIEF DESCRIPTION OF THE DRAWINGS

The invention may be understood by reference to the following description taken in conjunction with the accompanying drawings, in which like reference numerals identify like elements, and in which:

FIGS. 4A-4D are various views of an illustrative lifting device that may be employed with the present invention;

FIGS. 5A-5C are various views of another illustrative lifting device that may be employed with the present invention.

Figure 1:
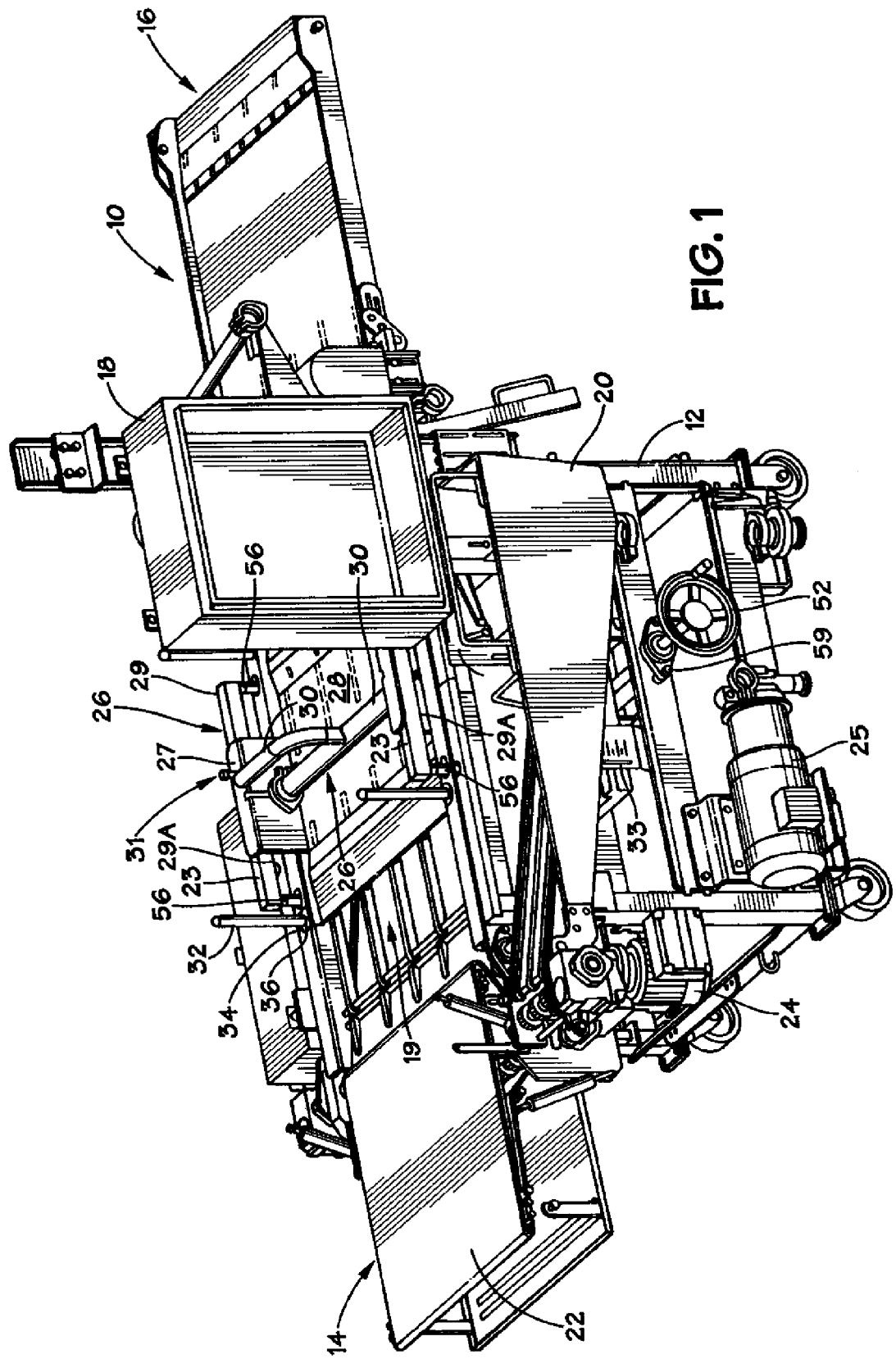
FIG. 1 is a perspective view of one illustrative embodiment of a batter applicator in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2A:
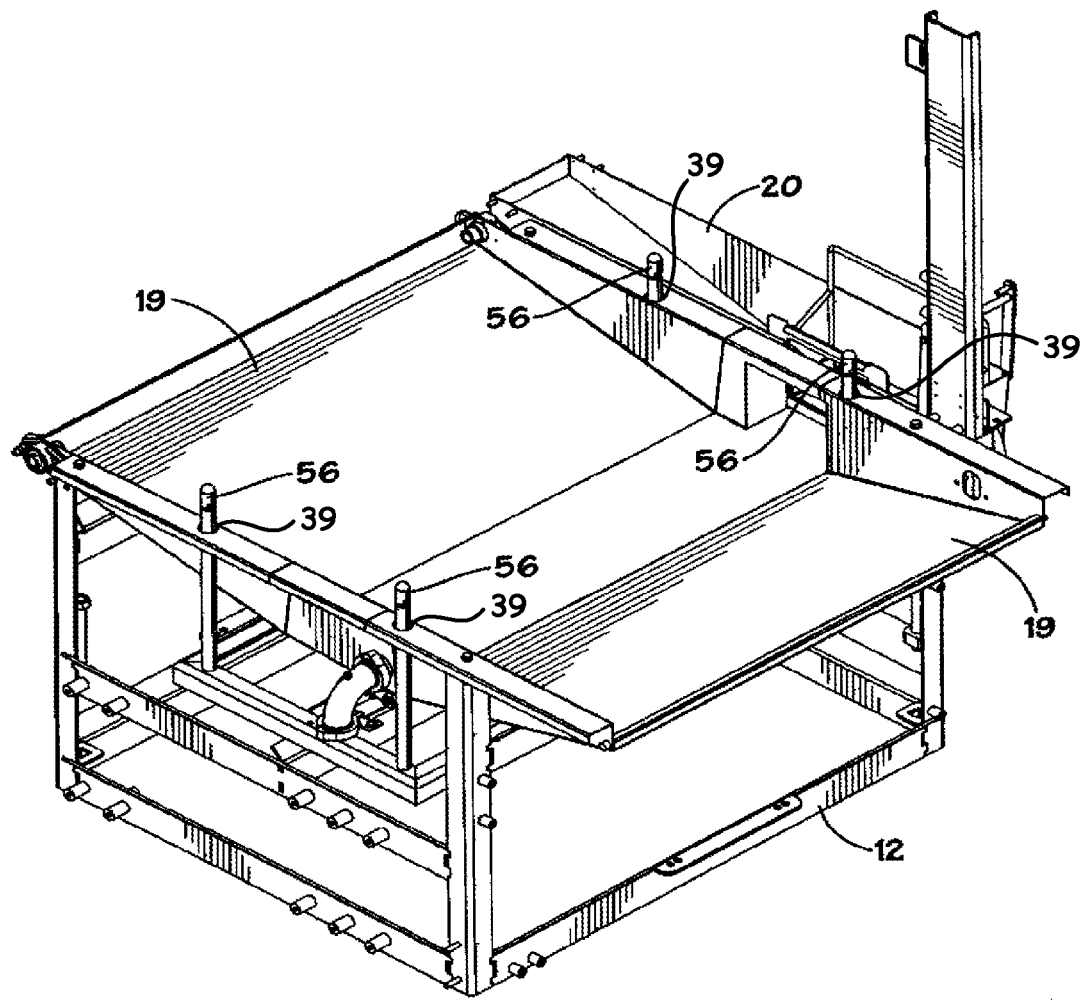
FIGS. 2A-2B are perspective side views of the main tank and frame of the illustrative batter applicator disclosed herein.
Figure 2B:
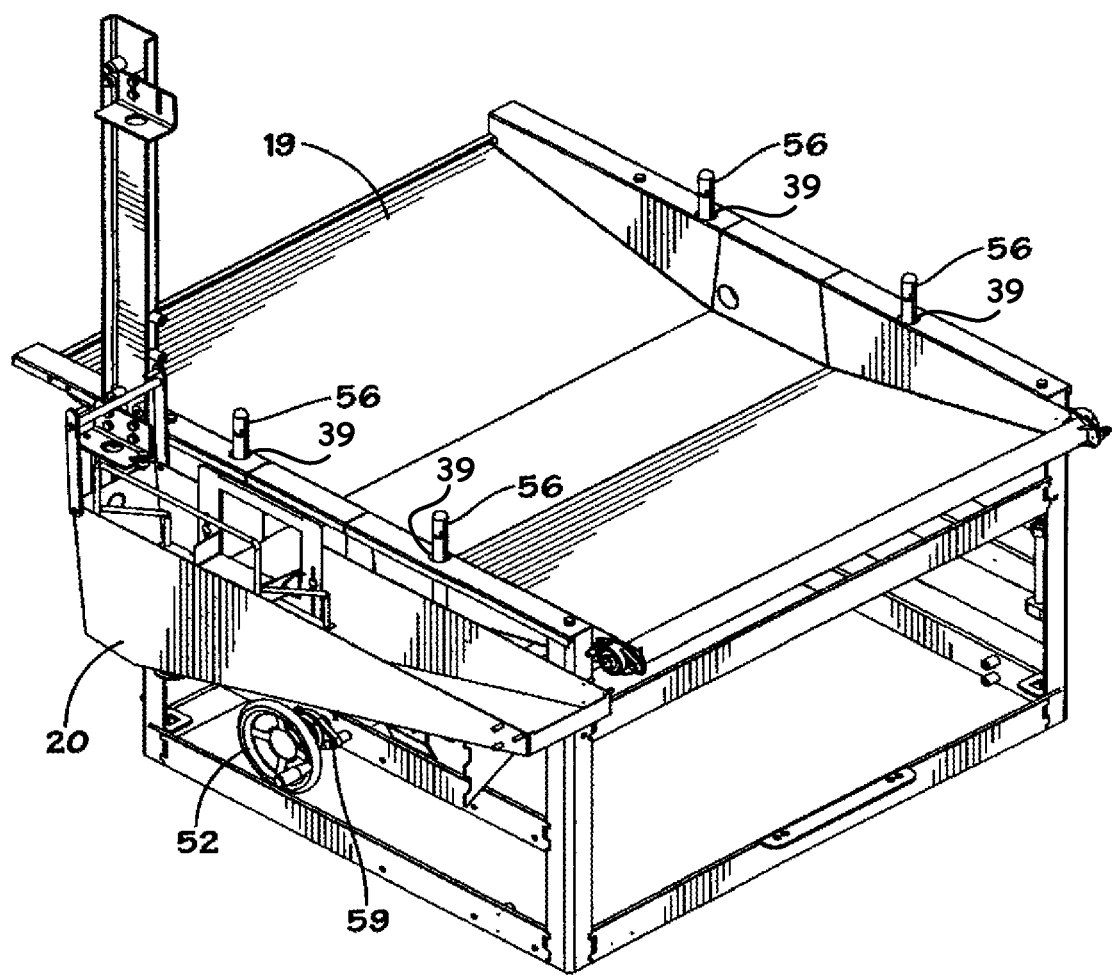

FIGS. 1 and 2A-2B are perspective views of an illustrative batter applicator apparatus 10 that may be employed in the food industry to apply batter to a food product. As will be recognized by those skilled in the art after a complete reading of the present application, the devices disclosed herein may be employed with a variety of different foods, e.g., poultry and vegetables, and thus should not be considered as limited to use with any particular type of food. Moreover, the batter applicator 10 described herein may be employed to apply a variety of different batters to different food products.

The apparatus 10 generally comprises a frame 12, a food inlet 14, a food outlet 16 and a control panel 18. The apparatus 10 further comprises a main batter tank 19, an overflow tank 20, a conveyor 22, an electric motor 24 to drive the conveyor 22 and a pump 25.

In the illustrative embodiment depicted in FIG. 1, the apparatus 10 further comprises an overflow structure 26 that is adapted to provide a curtain of batter material through which the food must pass as it moves from the food inlet 14 to the food outlet 16. The overflow structure 26 comprises a generally plate-like body 28, associated piping 30, and support brackets 27 coupled to the body 28. The overflow structure 26 further comprises a batter inlet 31. In operation, the pump 25 is used to supply batter to the batter inlet 31 of the overflow structure 26 through a hose (not shown) that is coupled to both the pump 25 and the batter inlet 31. Batter is supplied to the pump 25 via a hose (not shown) coupled to the overflow tank 20.

Also depicted in FIG. 1 is a support bracket 29 that is operatively coupled to or engages a plurality of lift pins 56. The operation of the lift pins 56 will be described later. The upper surface 23 of the support bracket 29 is adapted to engage the underside of the support bracket 27. The overflow structure 26 further comprises a plurality of guides 34 having a guide hole 36 formed therein. The guides 34 are integrally formed with or coupled to the plate-like body 28. The apparatus 10 further comprises a plurality of guide pins 32 attached to the frame 12. As will be described more fully below, the overflow structure 26 is free to move vertically relative to the frame 12 of the apparatus 10. During such vertical movement, the guide pins 32 and the guides 34 maintain the overflow structure 26 in its proper horizontal location.

Of course, those skilled in the art will understand that the particular details of the overflow structure 26 is provided by way of example only. Many variations as to the shape and configuration of the overflow structure 26 are possible without deviating from the scope of the present invention.

Figure 3:
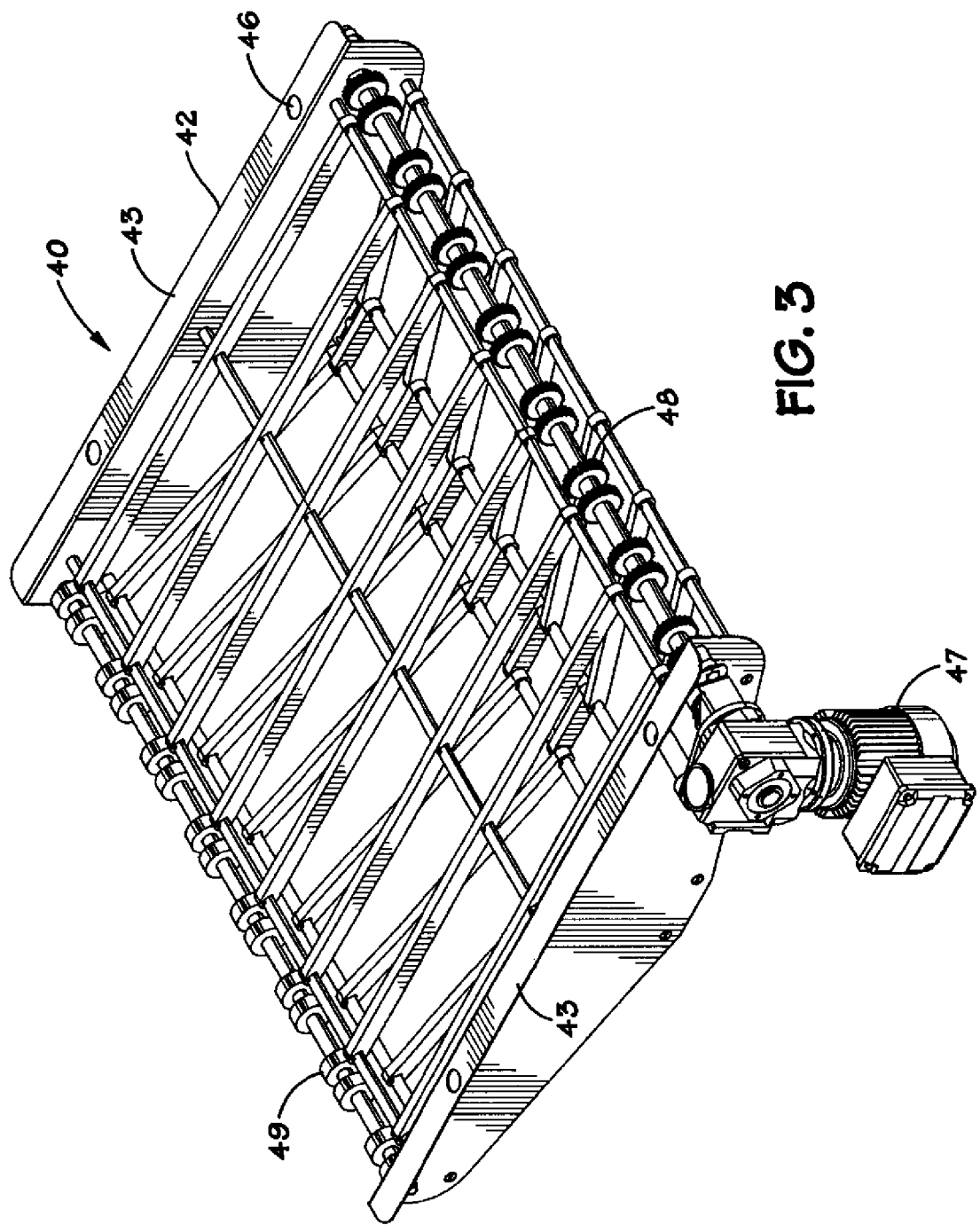
FIG. 3 is a perspective view of an illustrative submerger that may be employed with various embodiments of the present invention.

The illustrative batter applicator 10 depicted in FIG. 1 is provided with the overflow structure 26 and is designed to provide a curtain of batter as food passes through the apparatus 10. However, as will be recognized by those skilled in the art after a complete reading of the present application, the device disclosed herein may be employed to raise or lower other structures associated with a batter applicator 10. For example, FIG. 3 depicts an illustrative submerger device 40 that may be employed with the device disclosed herein. Such submerger devices 40 are well known to those skilled in the art and may have a variety of shapes and configurations. Thus, the details of the illustrative submerger device 40 depicted herein should not be considered a limitation of the present invention. In some cases, multiple structures, such as the overflow structure 26 and the submerger device 40, may be raised or lowered as a single unit, or they may be raised or lowered independently.

In general, the purpose of the submerger device 40 is to insure that food is submerged in the batter in the main batter tank 19 as the food progresses through the batter applicator 10. The illustrative submerger device 40 depicted herein comprises a frame 42 that is comprised of flanges 43 and a plurality of guide holes 46 formed in the flanges 43. The guide holes 46 are adapted to guidingly engage the guide pins 32 (see FIG. 1) on the frame 12 of the batter applicator 10. The submerger device 40 further comprises an electric motor 47 adapted to drive a plurality of drive sprockets 48. The submerger device 40 further comprises a plurality of idler rollers 49. In operation, a belt (not shown) is positioned around the idler rollers 49 and drive sprockets 48 and rotated as food passes through the batter applicator 10. This action insures that food is submerged in the main batter tank 19 and is fully coated with batter.

FIGS. 4A-4D are various views of the lift device 50 of the present invention. The lift device 50 generally comprises a frame 51 of various structural members 53, a plurality of lift pins 56, having end surfaces 70, an actuator device 52, e.g., a hand wheel, a shaft 55, a gear box 57 and a screw lift assembly 58. Of course, the size, shape and configuration of the various components of the lift device 50 may vary depending upon the particular application. Thus, the illustrative details depicted herein for the lift device 50 should not be considered a limitation of the present invention. In one illustrative embodiment, the gear box 57 may be a miter gear box having a 1:1 gear ratio. Of course, gear boxes with different gear ratios may be employed. The lift pins 32 may have any desired diameter, e.g., 0.5-1.5 inches.

Figure 4B:
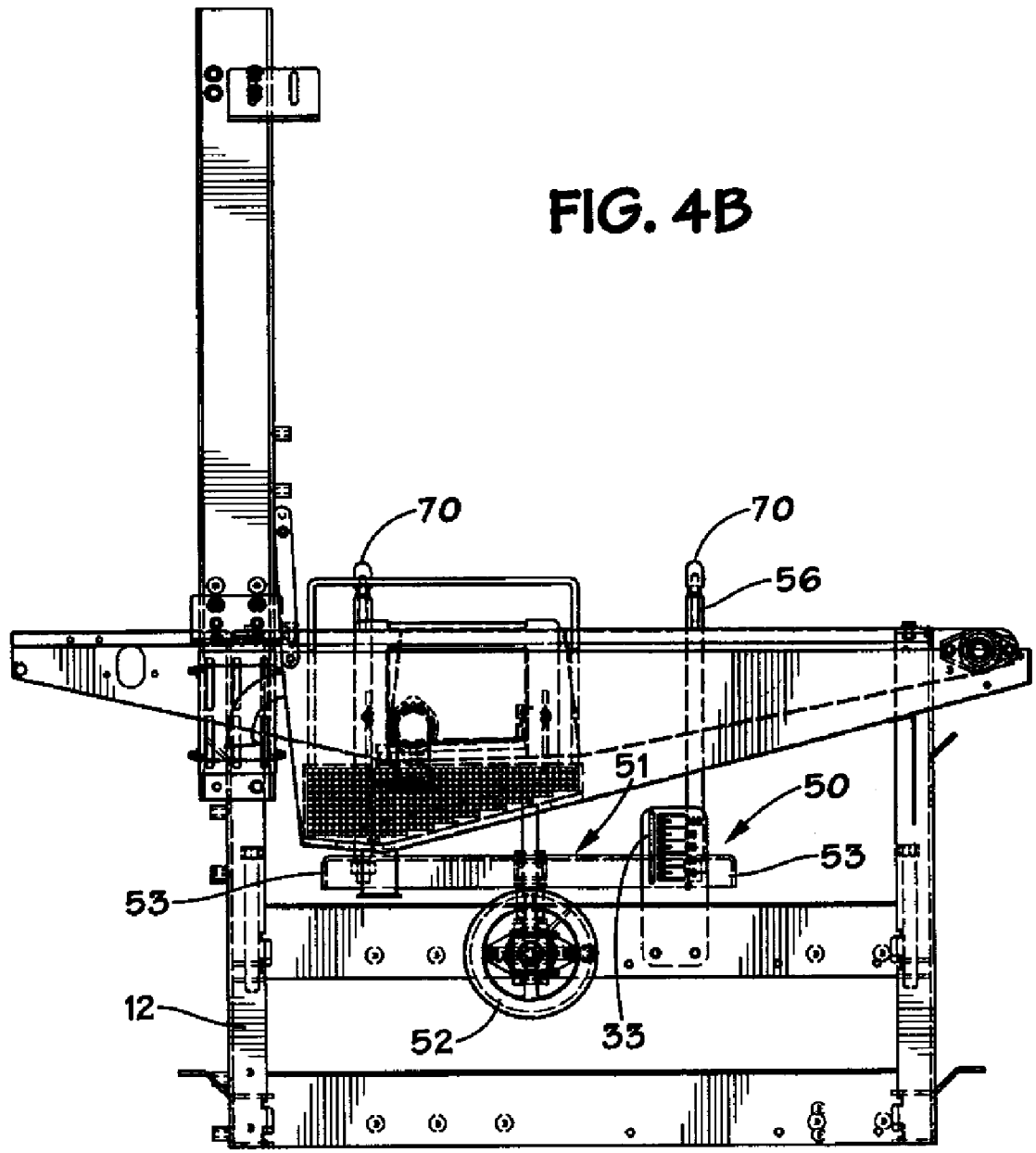
Figure 4C:
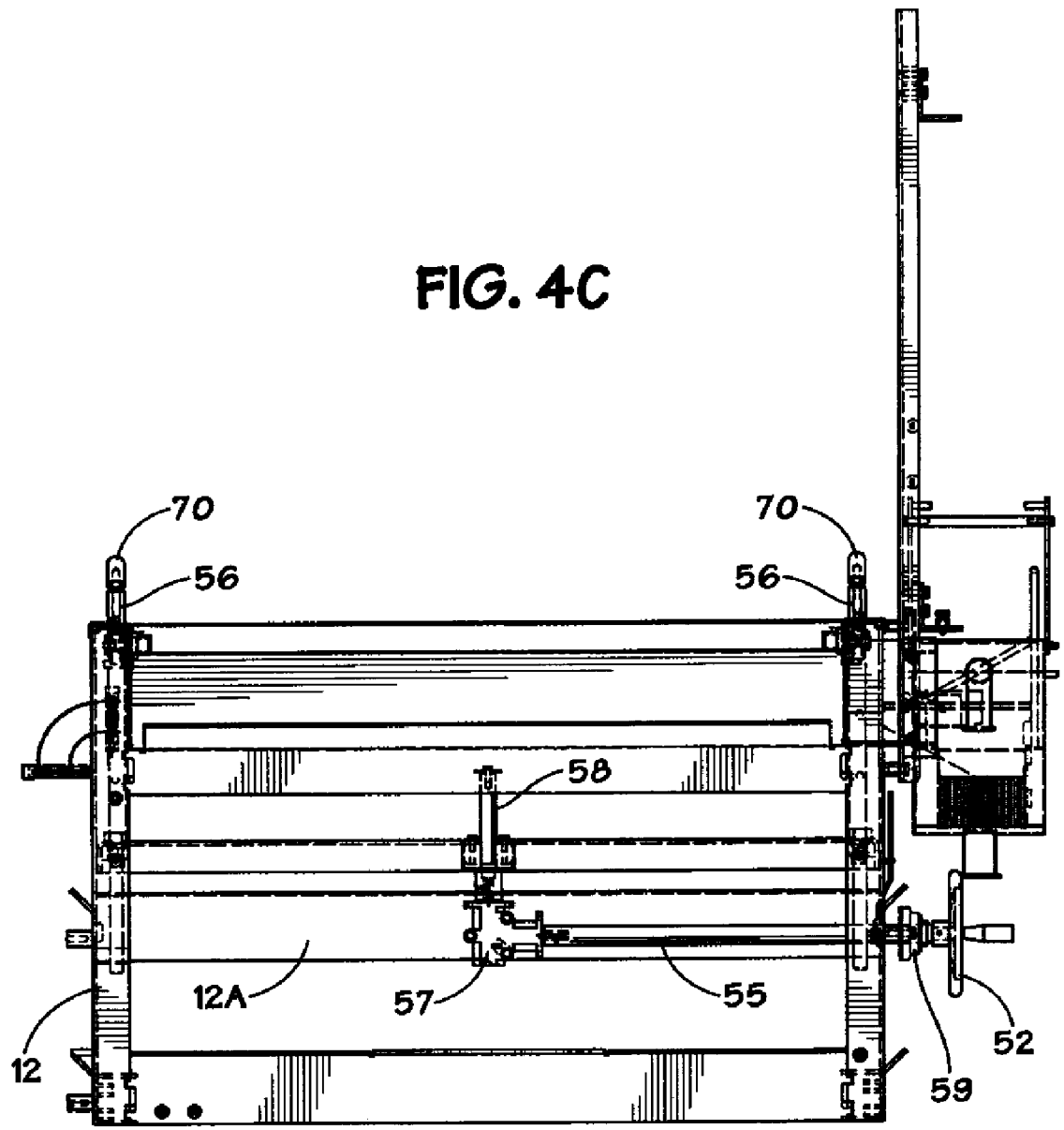

As shown in FIGS. 4B and 4C, the gear box 57 and shaft 55 are operably coupled to the frame 12. For example, the gear box 57 may be fastened to a support member 12A of the frame 12 by a plurality of mechanical fasteners. One end of the shaft 55 may be coupled to the frame 12 via a bearing flange 59, which allows the shaft 55 to rotate therein.

As shown in FIG. 4D, the center structural member 53C of the lifting device 50 may be operatively coupled to the screw lift assembly 58 via a threaded block 72. The threaded block 72 is coupled to the center structural member 53C by a plurality of mechanical fasteners 74, e.g., screws, bolts, etc. As the screw lift assembly 58 is rotated, via the actuator device 52 and gear box 57, the frame 51 travels up or down the screw lift assembly 58 via the engagement of the threaded block 72. The movement of the frame 51 causes a corresponding movement of the lift pins 56. It should be understood that although an illustrative hand wheel is depicted, the actuator device 52 may be a portion of a device or structure that is capable of causing movement of the lift pins 56.

Figure 6:
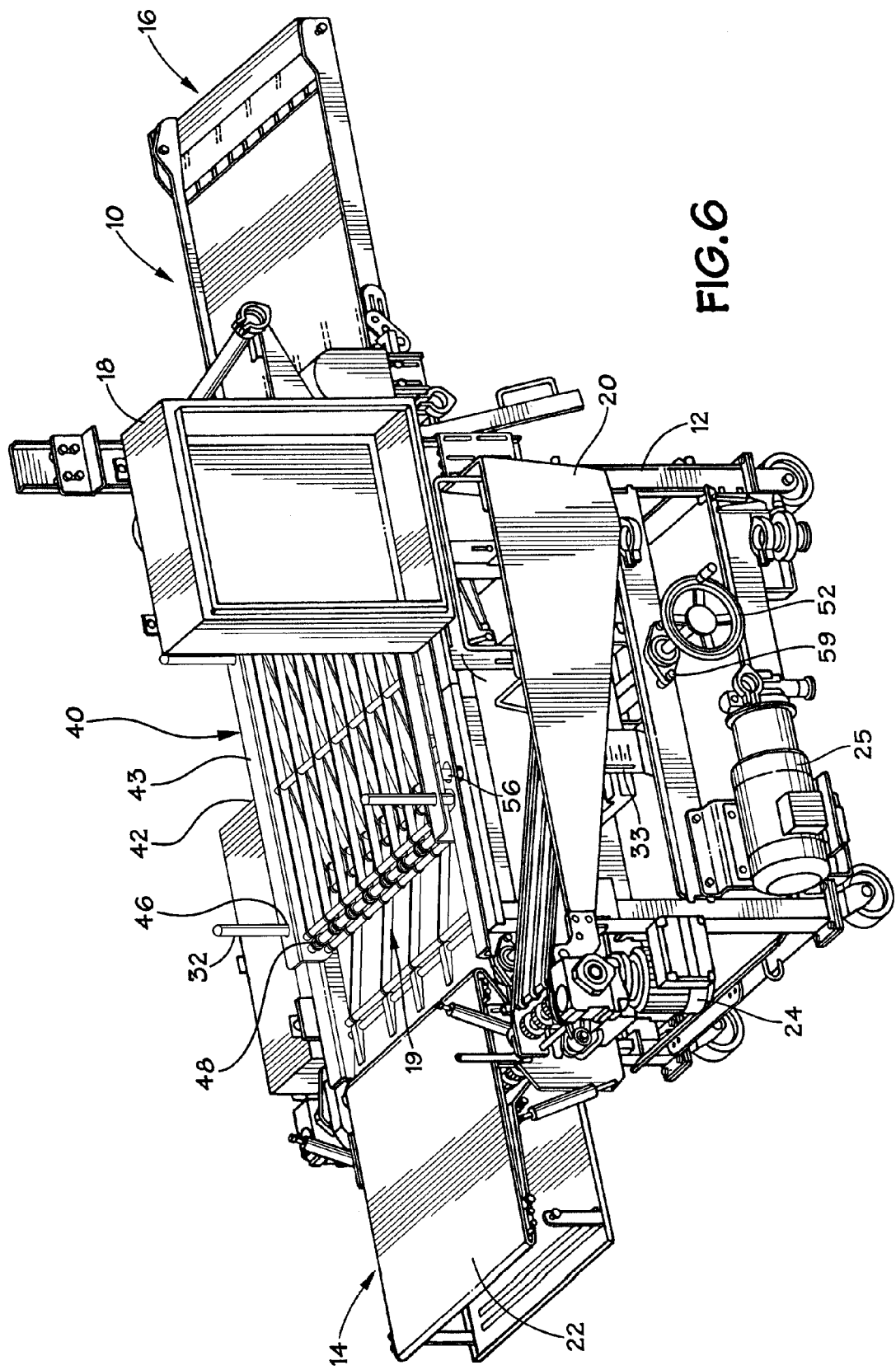
FIG. 6 is a perspective view of another illustrative embodiment of a batter applicator in accordance with the present invention.

In operation, the lift device 50 is used to raise or lower a structure, e.g., the overflow structure 26 or the submerger 40, relative to the main batter tank 19 of the batter applicator 10. In some embodiments, the end surfaces 70 of the lift pins 32 may directly engage some portion of the structures to be moved relative to the main batter tank 19, e.g., the end surfaces 70 may engage the underside of the flanges 43 of the submerger 40. In the illustrative example depicted in FIG. 1, the end surfaces 70 of the lift pins 32 engage or are attached to the bottom surface 29A of the support brackets 29 that, in turn, engage the brackets 27 of the overflow structure 26. The lift pins 56 extend through openings 39 (see FIGS. 2A-2B) formed in the frame 12 of the batter applicator 10. Depending upon the particular application, the end surface 70 of the lift pins 56 may only engage a portion of the structure to be lifted, or they may actually be coupled to another structure, such as the structure 29 depicted in FIG. 1. Ultimately, the lift pins 56 may directly engage the member to be lifted (as in the illustrative example depicted in FIG. 6 employing the submerger 40) or they may indirectly engage the structure to be lifted via a variety of intermediate members, such as the bracket 29 that engages the underside of the flanges 27 on the overflow structure 26 as shown in FIG. 1. In the embodiment where the submerger device 40 is employed (see FIG. 6), the end surface 70 of the lift pins 56 is adapted to engage the underside of the flanges 43 of the frame 42. Thus, when reference is made to the lift pins 56 being operatively engaged or operatively coupled to another structure, it should be understood that such language is intended to cover direct coupling between the lift pins 56 and such a structure or indirect coupling via one or more intermediate structures between the lift pin 56 and such a structure.

In operation, an operator of the batter applicator 10 may raise or lower a structure, e.g., the overflow structure 26 or the submerger 40, or a combination of both, relative to the main batter tank 19 by rotating the hand wheel 52. A measuring device or bracket 33 (see FIGS. 1 and 4B) is provided to accurately determine the vertical position of the lifted structure relative to some point of reference, e.g., the bottom of the main batter tank 19. As the hand wheel 52 is rotated, the frame 51 and lift pins 56 travel upward on the screw lift 58. In turn, the end surfaces 70 of the lift pins 56 operative engage and cause upward movement of the desired device or structure, e.g., the overflow structure 26 or the submerger 40. The guide pins 32 and guards or openings 34, 46 act to maintain the moved structure in the desired horizontal position.

Figure 5A:
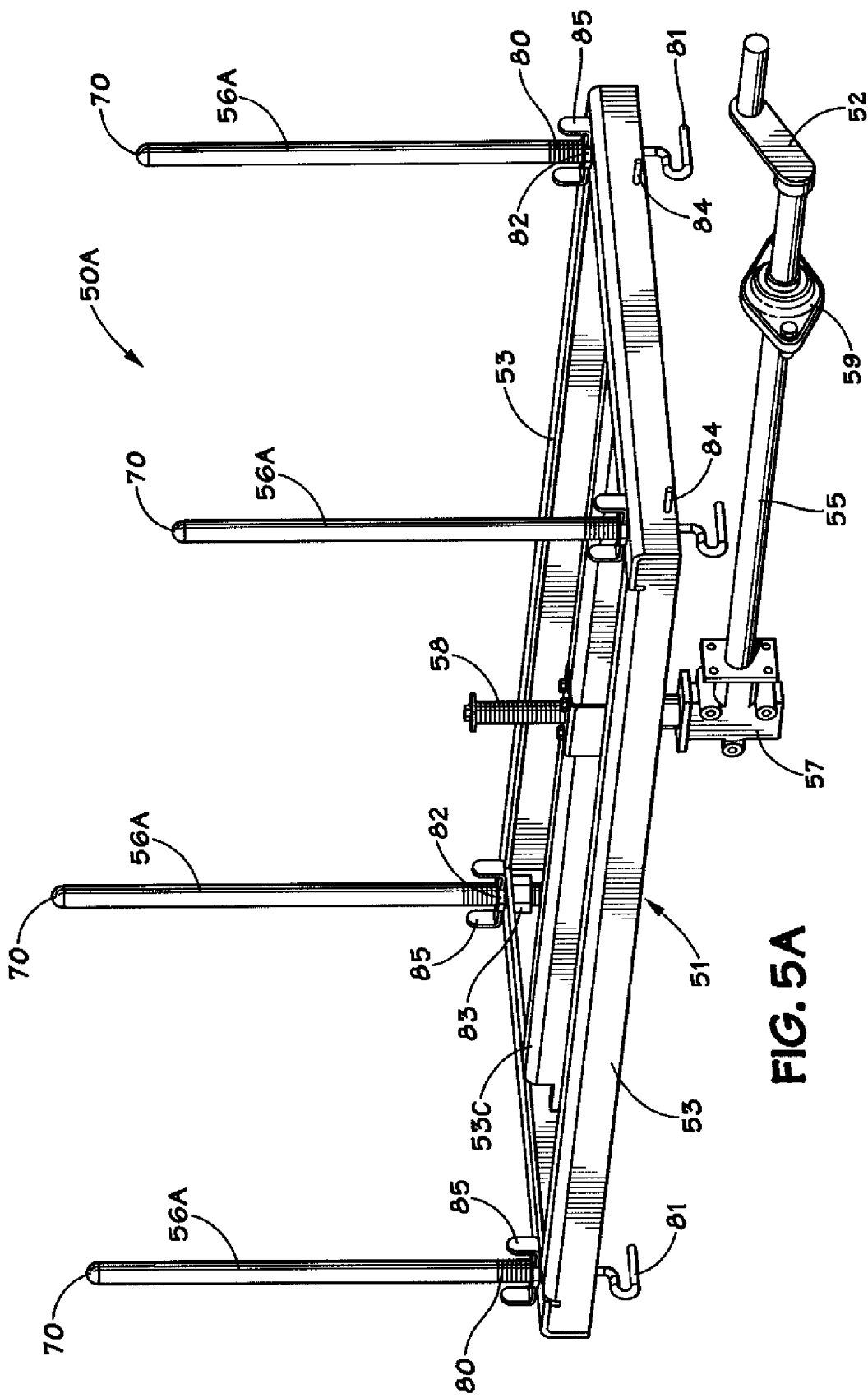
Figure 5B:
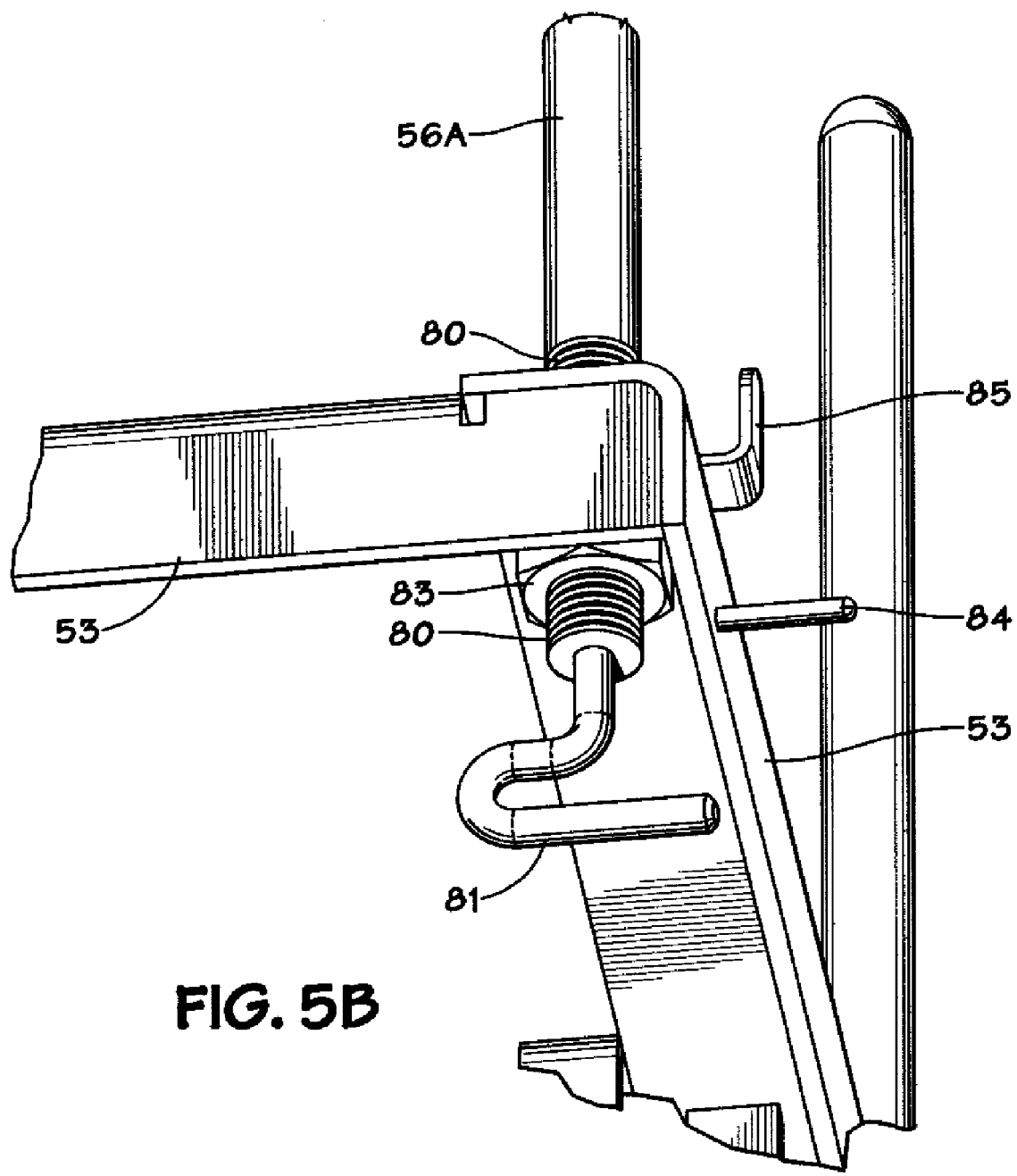

FIGS. 5A-5C are various views of another lift device 50A of the present invention. The lift device 50A provides additional capabilities relative to the lift device 50 shown in FIGS. 4A-4D. The lift device 50A contains many structural similarities to the lifting device 50. Thus, only a brief review of some aspects of the lift device 50A will be described, with the understanding that like reference numbers refer to similar structures. The lift device 50A generally comprises a frame 51 of various structural members 53, a plurality of lift pins 56A, having end surfaces 70, an actuator device 52, e.g., a handle, a shaft 55, a gear box 57 and a screw lift assembly 58. The lift pins 56A comprise a threaded end 80, a handle 81, a stop nut 82 with tabs 85, and a fixed nut 83. The threaded end 80 of the lift pins 56A extend through one or more of the structural members 53 of the frame 51. An indicator pin 84 is coupled to a portion of the frame 51. A measuring device or bracket 33 (see FIG. 5C) is coupled directly or indirectly to the frame 12 or some other desired point of reference. Of course, the size, shape and configuration of the various components of the lift device 50A may vary depending upon the particular application. Thus, the illustrative details depicted herein for the lift device 50A should not be considered a limitation of the present invention. In one illustrative embodiment, the gear box 57 may be a miter gear box having a 1:1 gear ratio. Of course, gear boxes with different gear ratios may be employed. The lift pins 56A may have any desired diameter, e.g., 0.5-1.5 inches.

The gear box 57 and shaft 55 may be operably coupled to the frame 12 as previously described for the embodiment shown in FIGS. 4A-4D. For example, the gear box 57 may be fastened to a support member 12A of the frame 12 by a plurality of mechanical fasteners. One end of the shaft 55 may be coupled to the frame 12 via a bearing flange 59, which allows the shaft 55 to rotate therein.

The center structural member 53C of the lifting device 50A may be operatively coupled to the screw lift assembly 58, as previously described. The threaded block 72 is coupled to the center structural member 53C by a plurality of mechanical fasteners 74, e.g., screws, bolts, etc. As the screw lift assembly 58 is rotated, via the actuator device 52 and gear box 57, the frame 51 travels up or down the screw lift assembly 58 via the engagement of the threaded block 72. The movement of the frame 51 causes a corresponding movement of the lift pins 56A. It should be understood that although an illustrative handle is depicted, the actuator device 52 may be a portion of a device or structure that is capable of causing movement of the lift pins 56.

The embodiment depicted in FIGS. 5A-5C may be used as described previously with respect to the lift device 50 depicted in FIGS. 4A-4D. However, unlike the lift device 50 depicted in FIGS. 4A-4D, in the lift device 50A depicted in FIGS. 5A-5C, the height or length of each of the lift pins 56A is independently adjustable due to the addition of the threaded end 80 and its interaction with the other components described previously. With the individually adjustable lift pins 56A, the tilt or level of a structure, e.g., the overflow structure 26 or the submerger 40, relative to a reference horizontal plane may be adjusted. For example, by lowering or raising the front two lift pins 56A, the overflow structure 26 or the submerger 40 may be made to tilt forward or rearward, respectively, relative to any reference horizontal surface. The length of the pins 56A may be employed to cause the engaged structure to tilt from side to side as well, if desired. By controlling the length of the lift pins 56A, the engaged structure, e.g., the overflow structure 26 or the submerger 40, may be tilted from front to back, from side to side, or a combination thereof. In one particular example, the lift pins 56A may be used to adjust the tilt of such a structure so that more or less batter is applied to the food as it passes through the machine. As with the previous embodiment depicted in FIGS. 4A-4D, the lift device 50A depicted in FIGS. 5A-5C may also be uniformly raised by raising the frame 51. In some applications, only a single adjustable length lift pin 56A may be employed to control the tilt of the structure. For example, three pins may be employed to define a plane, e.g., such pins may be spaced in a triangular pattern, and only one of the pins may have an adjustable length like that described for the pins 56A. Thus, various configurations are possible with the present invention.

The length of the pins 56A may be readily adjusted. The fixed nut 83 may, in one embodiment, be welded to the structural member 53. The stop nut 82 may be loosened by engaging the tabs 85. Thereafter, the effective length of the lift pin 56A, e.g., the distance between the end surface 70 and the top of the frame 51, may be adjusted by rotating the lift pin 56A, via the handle 81, within the fixed nut 83. The indicator pin 84 travels within the slot 86 within the measuring device or bracket 33, i.e., a length or tilt indicator. In one embodiment, each of the lift pins 56A may have an associated measuring device or bracket 33 positioned adjacent the lift pin 56A. The position of the indicator pin 84 within the slot 86 may be indicative of the absolute or relative effective length of the lift pins 56A and/or the relative or absolute position of the ends 70. Once one or more of the lift pins 56A are set at their desired height, the stop nut 82 may be tightened.

In operation, the lift device 50A may be used to raise or lower a structure, e.g., the overflow structure 26 or the submerger 40, relative to the main batter tank 19 of the batter applicator 10. The lift device 50A may also be employed to tilt or control the tilt of an engaged structure, e.g., the overflow structure 26 or the submerger 40. In some embodiments, the end surfaces 70 of the lift pins 56A may directly engage some portion of the structures to be moved or tilted relative to the main batter tank 19, e.g., the end surfaces 70 may engage the underside of the flanges 43 of the submerger 40. The end surfaces 70 of the lift pins 56A may engage or be attached to the bottom surface 29A of the support brackets 29 that, in turn, engage the brackets 27 of the overflow structure 26. The lift pins 56A may extend through openings 39 (see FIGS. 2A-2B) formed in the frame 12 of the batter applicator 10. Depending upon the particular application, the end surface 70 of the lift pins 56A may only engage a portion of the structure to be lifted, or they may actually be coupled to another structure, such as the structure 29 depicted in FIG. 1. Ultimately, the lift pins 56A may directly engage the member to be lifted (as in the illustrative example employing the submerger 40) or they may indirectly engage the structure to be lifted via a variety of intermediate members, such as the bracket 29 that engages the underside of the flanges 27 on the overflow structure 26 as shown in FIG. 1. In the embodiment where the submerger device 40 is employed, the end surface 70 of the lift pins 56A is adapted to engage the underside of the flanges 43 of the frame 42. Thus, when reference is made to the lift pins 56A being operatively engaged or operatively coupled to another structure, it should be understood that such language is intended to cover direct coupling between the lift pins 56A and such a structure or indirect coupling via one or more intermediate structures between the lift pin 56 and such a structure.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A batter applicator, comprising:
   (a) a first frame;
   (b) a main batter tank;
   (c) a batter application structure positioned proximate said main batter tank, the batter application structure comprising at least one of the group consisting of (a) a submerger and (b) an overflow structure; and
   (d) a lifting device for positioning said batter application structure vertically relative to said main batter tank, said lifting device comprising:
      (i) a second frame disposed below said main batter tank, wherein the second frame is selectively movable in a substantially vertical direction; and
      (ii) a plurality of support members extending upward from the second frame to support the batter application structure, said batter application structure being selectively tiltable from a first orientation relative to a reference horizontal surface to a second orientation.

2. The batter applicator of claim 1, wherein a length of each of the plurality of support members is individually adjustable.

3. The batter applicator of claim 2, wherein said plurality of support members comprises four lift pins.

4. The batter applicator of claim 2, wherein each of said plurality of support members comprises a threaded end that is adapted to engage a fixed nut.

5. The batter applicator of claim 4, wherein each of said plurality of support members comprises means for rotating said support member.

6. The batter applicator of claim 5, wherein said means for rotating comprises a handle.

7. The batter applicator of claim 4, further comprising a stop nut on each of said plurality of support members, said stop nut threadingly engaging said threaded end of said support member.

8. The batter applicator of claim 1, further comprising a measuring device for measuring a tilt of said structure.

9. The batter applicator of claim 2, further comprising a plurality of tilt indicators positioned proximate each of the plurality of support members.

10. The batter applicator of claim 1, wherein said lifting device selectively tilts said batter application structure in a front to a back direction.

11. The batter applicator of claim 1, wherein said lifting device selectively tilts said batter application structure in a side to side direction.

12. The batter applicator of claim 1, the lifting device further comprising an actuator operably coupled to said second frame to selectively move said second frame, movement of said second frame translating said plurality of support members in a substantially vertical direction, wherein said lifting device selectively positions said batter application structure vertically relative to said main batter tank.

13. The batter applicator of claim 12, wherein said actuator further comprises a mechanical gear box.

14. The batter applicator of claim 13, wherein said actuator further comprises a screw lift assembly.

15. The batter applicator of claim 1, wherein said second frame is at least partially disposed beneath the main batter tank.

16. The batter applicator of claim 1, wherein said batter application structure is a submerger that is comprised of a plurality of drive rollers, a plurality of idler rollers, and an electric motor operatively coupled to said plurality of drive rollers.

17. The batter applicator of claim 1, wherein said batter application structure is an overflow structure that is adapted to create a curtain of batter, the overflow structure comprising a body and at least one pipe section coupled to said body.

18. The batter applicator of claim 1, wherein said plurality of support members comprises three lift pins, wherein a length of each of said lift pins is adjustable.

19. A batter applicator, comprising:
   (a) a first frame;
   (b) a main batter tank;
   (c) a batter application structure positioned proximate to said main batter tank, said batter application structure comprising at least one of the group consisting of (a) a submerger and (b) an overflow structure; and
   (d) a lifting device for positioning said batter application structure relative to said main batter tank, the lifting device comprising a second frame disposed below said main batter tank, wherein the second frame is selectively movable in a substantially vertical direction, and a plurality of support members extending upward from the second frame to support the batter application structure, wherein the support members are adjustable to selectively adjust the tilt of said batter application structure from a first orientation relative to a reference horizontal surface to a second orientation.

20. The batter applicator of claim 19, wherein a length of each of the plurality of support members is individually adjustable.

21. The batter applicator of claim 19, further comprising a measuring device for measuring a tilt of said batter application structure.

22. The batter applicator of claim 20, further comprising a plurality of tilt indicators positioned proximate each of the plurality of support members.

23. The batter applicator of claim 19, wherein said lifting device selectively tilts said batter application structure in a front to a back direction.

24. The batter applicator of claim 19, wherein said lifting device selectively tilts said batter application structure in a side to side direction.

25. The batter applicator of claim 19, said lifting device selectively positioning said batter application structure vertically relative to said main batter tank.

26. The batter applicator of claim 19, wherein said batter application structure is a submerger that is comprised of a plurality of drive rollers, a plurality of idler rollers, and an electric motor operatively coupled to said plurality of drive rollers.

27. The batter applicator of claim 19, wherein said batter application structure is an overflow structure that is adapted to create a curtain of batter, the overflow structure comprising a body and at least one pipe section coupled to said body.

28. The batter applicator of claim 1, wherein the first orientation is a substantially horizontal orientation.

29. The batter applicator of claim 1, wherein the second orientation is a substantially horizontal orientation.

* * * * *